(No Model.)  2 Sheets—Sheet 1.
W. R. JONES.
ART OF MAKING RAILS.
No. 326,908. Patented Sept. 22, 1885.
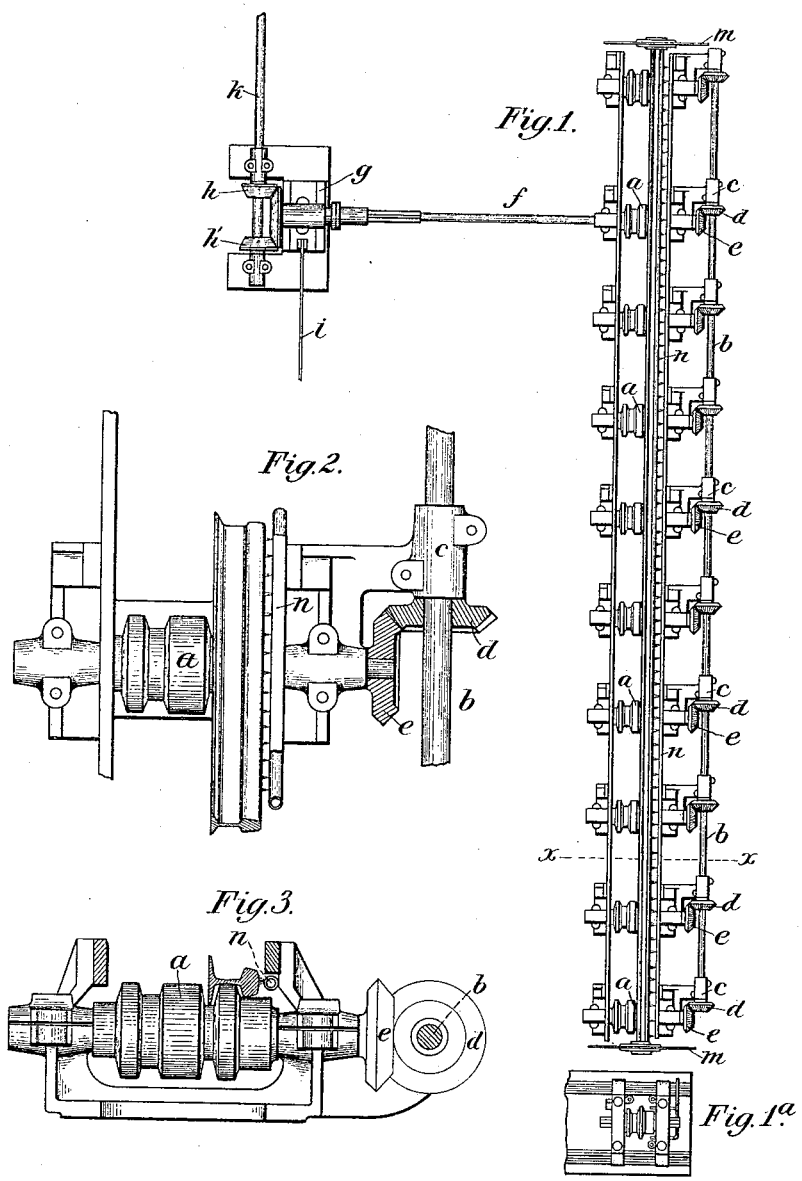
Witnesses.
J. A. Burns
H. L. Gill
Inventor
William R. Jones
By his attys
Bakewell & Kerr
N. PETERS, Photo-Lithographer, Washington, D. C.

(No Model.) 2 Sheets—Sheet 2.

W. R. JONES.
ART OF MAKING RAILS.

No. 326,908. Patented Sept. 22, 1885.

Witnesses
J. A. Burns.
H. L. Gill.

Inventor
William R. Jones
by his attys
Bakewell & Kerr

UNITED STATES PATENT OFFICE.

WILLIAM R. JONES, OF BRADDOCK, PENNSYLVANIA.

ART OF MAKING RAILS.

SPECIFICATION forming part of Letters Patent No. 326,908, dated September 22, 1885.

Application filed July 20, 1885. (No model.)

*To all whom it may concern:*

Be it known that I, WILLIAM R. JONES, of Braddock, in the county of Allegheny and State of Pennsylvania, have invented a new and useful Improvement in the Manufacture of Rails; and I do hereby declare the following to be a full, clear, and exact description thereof.

It is the object of my invention to improve the manufacture of railroad-rails by supplying means for hardening their wearing-surfaces, and thereby increasing their durability and efficiency. Heretofore rails have been hardened in the process of manufacture of their metallic substance by the addition of manganese, carbon, or other similar metalloid. Such treatment will harden the rail, but is disadvantageous in that the hardening is not confined to the parts most exposed to wear, but extends throughout the mass of the rail and makes it too brittle to be used with safety. In the rails now in common use the greater part of the metal is in the head, which receives the greatest strain of compression, while the web and flange are made of much lighter material, because the strain upon them is tensile rather than compressive. If, therefore, the head be made of uncompressible material and the web and flange comparatively soft and ductile, a rail best suited to resist the conditions of wear is attained. I make such a rail by first heating it and then chilling the head suddenly and allowing the flange and web to cool gradually, preferably doing this by spraying the head of the heated rail with water, oil, or other suitable evaporable liquid, while the other parts are left untreated. The result is that the head of the rail is made considerably harder than the web and flange.

I will now more particularly describe my improvement with reference to the accompanying drawings, forming part of this specification, in which—

Figure 4:
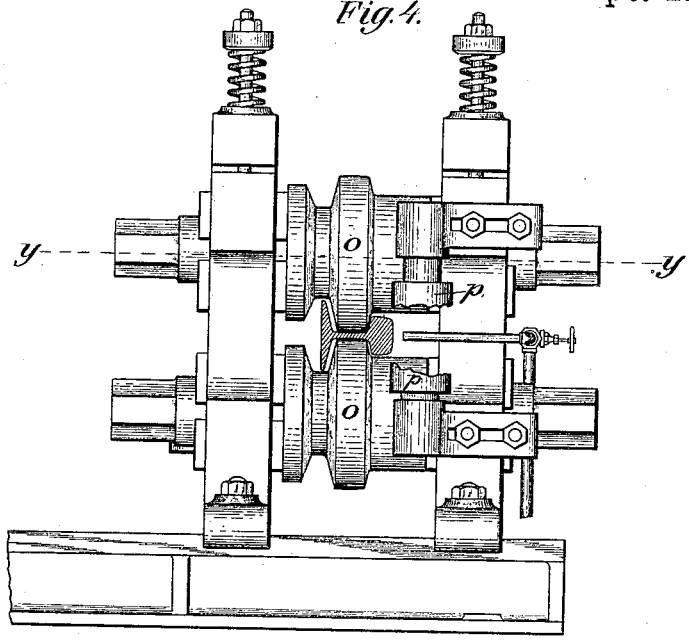
Figure 5:
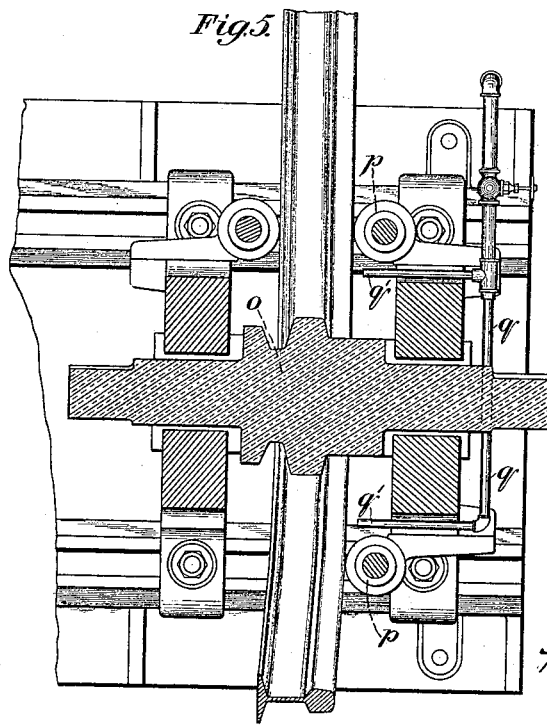

Figures 1 and 1ª together constitute a plan view of a system of rolls or conveyers and a pair of bending-rolls, shown in connection with apparatus for carrying my improved method of manufacture into effect. Fig. 2 is a plan view of a part of Fig. 1. Fig. 3 is a vertical cross-section on the line *x x* of Fig. 1. Fig. 4 is an end view of the part shown in Fig. 1ª. Fig. 5 is a horizontal cross-section on the line *y y* of Fig. 4.

Like letters of reference indicate like parts in each.

Referring now to the drawings, in Fig. 1 there is shown a series of conveying-rolls, *a*, situate in order, with their axes parallel. They are connected with a common driving-shaft, *b*, journaled in standards *c*, and geared to the several rolls by means of mitered pinions *d* on the shaft and spur-wheels *e* on the axes of the rolls. Power is communicated to one of the latter by means of a rotary driving-shaft, *f*, the spur-wheel of which, by means of a sliding block, *g*, and lever *i*, is made movable into gear with either of two pinions, *h* and *h'*, on the primary driving-shaft *k*, or out of gear with both, so that the shaft *f* and the several rolls may be caused to revolve in either direction, or to remain at rest, as may be desired. At each end of the series of rolls is a saw, *m*, which is mounted in hangers movable vertically to cause the saw to engage a rail when projecting from the end roll at each end of the series. The rolls are suitably grooved, as shown in Fig. 3, to fit the parts of a rail, and the several rolls together are used for the purpose of conveying a rail inserted at the adit to the other end of the series. Arranged parallel with the course of the rail, and near thereto, is a pipe, *n*, perforated along its length with discharge-outlets, which are so directed that when a rail is placed upon the rolls and water introduced into the pipe it may be discharged in jets upon the head of the rail.

Thus constructed the operation is as follows: After the rail has been rolled, and while it is still hot, it is taken from the finishing-rolls and its end placed upon the outermost roll of the series, and the operator moves the lever *i* so as to start the rolls and to carry the rail forward in the direction of the arrow in Fig. 1. When it has been brought to the desired position, resting in the grooves of the rolls, with its ends projecting beyond each end of the series, the rotation of the rolls is stopped and the saws *m* are lowered upon the rail and cut off its rough ends. A suitable valve in the pipe *n* is then opened, and jets of water are immediately sprayed upon the opposite head of the rail, which has been introduced to the rolls, lying on its side with the head directed to the water-pipe. When sufficient water has been discharged on the rail to give it the desired hardness, the rolls are again started to revolve in either direction, and the rail thereby removed; or the operation of treating with water and removing the rail may be done simultaneously.

My improved method may also be conveniently applied to use in connection with the device illustrated in Figs. 1ᵃ, 4, and 5. It consists in placing opposite to the exit end of the conveyer-rolls a curver for straightening the rails after they have been manufactured. As is well known, after heating the rail the web and flange, having much less metal than the head, cool more rapidly and bend the rail. This is obviated by bending the rail while still hot in the reverse direction to the bend of contraction. The rail is inserted between a pair of two-high rolls, $o$, grooved so as to grasp the web, as shown in Fig. 4. At the adit and exit sides of the rolls are friction-rollers $p$, mounted on vertical axes and movable and adjustable laterally to the course of the rail, so that they may engage the sides thereof. (See Fig. 5.) These rollers being set out of a right line with each other in the proper direction, curve the rail a little in the opposite direction from the curve of contraction, so that when it is finally cooled it may be perfectly true. A water-pipe, $q$, is arranged in this curver, and is provided with jet-pipes $q'$, directed toward the head of the rail, in order to spray water thereon during the course of the rail for the purpose of hardening it, as before described.

In practice it will be found preferable to treat the rail with liquid after it has been cut by the saws $m$, because if it be cut afterward the rail will be apt to cool so much as to render it practically impossible to be cut by the saws now in common use.

I do not limit the scope of my invention to the peculiar apparatus hereinbefore described, for it is clear that the same process may be carried out by the use of various mechanisms.

What I claim as my invention, and desire to secure by Letters Patent, is—

1. An improvement in the art of making rails, which consists in heating the rail and then cooling the head more rapidly than the remaining parts thereof, substantially as and for the purpose described.

2. An improvement in the art of making rails, which consists in partially cooling the head of the heated rail as it comes from the finishing-rolls by contact with a cooling-liquid, substantially as and for the purpose described.

In testimony whereof I have hereunto set my hand this 18th day of July, A. D. 1885.

WILLIAM R. JONES.

Witnesses:
W. B. CORWIN,
J. K. SMITH.